(12) United States Patent
Sung

(10) Patent No.: US 7,280,591 B2
(45) Date of Patent: Oct. 9, 2007

(54) INTEGRATED REDUCED MEDIA INDEPENDENT INTERFACE

(75) Inventor: Da-Cheng Sung, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 836 days.

(21) Appl. No.: 10/605,549

(22) Filed: Oct. 7, 2003

(65) Prior Publication Data
US 2004/0196074 A1    Oct. 7, 2004

(30) Foreign Application Priority Data
Apr. 7, 2003   (TW) .............................. 92107930 A

(51) Int. Cl.
*H04B 1/38* (2006.01)
*H04L 5/16* (2006.01)
*H04L 25/00* (2006.01)

(52) U.S. Cl. ........................ 375/220; 375/257; 370/419

(58) Field of Classification Search ................ 375/220, 375/222, 223, 257, 259; 370/386, 419, 501
See application file for complete search history.

(56) References Cited

U.S. PATENT DOCUMENTS

| 6,678,321 | B1 * | 1/2004 | Graham et al. | ............. 375/238 |
| 6,741,612 | B1 * | 5/2004 | Butler et al. | ................ 370/501 |
| 7,042,893 | B1 * | 5/2006 | Lo et al. | ..................... 370/419 |
| 7,065,075 | B1 * | 6/2006 | Lo | .............................. 370/386 |

* cited by examiner

*Primary Examiner*—Don N. Vo
(74) *Attorney, Agent, or Firm*—Winston Hsu

(57) ABSTRACT

An integrated reduced media independent interface (Integrated RMII) and related method for interconnecting a MAC Circuit and a PHY Circuit. The Integrated RMII comprises a TXD, a TX_EN, a REF_CLK, a CRS_DV, and a RXD as essentially specified in the IEEE 802.3 and IEEE 802.3u specifications. The CRS_DV is at a predetermined low potential in an error-detection mode and an idle mode, and at a predetermined high potential in a transmission mode. When the CRS_DV is at the predetermined low potential, the MAC Circuit can reject data transmitted from the PHY Circuit via the RXD. When the CRS_DV is at the predetermined high potential, the MAC Circuit can receive the data transmitted from the PHY Circuit via the RXD.

18 Claims, 4 Drawing Sheets

INTEGRATED REDUCED MEDIA INDEPENDENT INTERFACE

BACKGROUND OF INVENTION

1. Field of the Invention

The present invention relates to an integrated reduced media independent interface, and more specifically, to an integrated reduced media independent interface for reducing pin count and related method.

2. Description of the Prior Art

In modern society, information flows acrossnetworks so that people can share information and technology. With the growing need for bandwidth, significant development is occurring in the area of high-speed networking. In the future, Ethernet will not only be used in local area networks (LANs) but also in wide area networks (WANs).

In the related specifications of Ethernet, the media independent interface for connecting a medium access control circuit (MAC circuit) and a physical circuit (PHY Circuit) is replaced by the reduced media independent interface (RMII). The specification of the reduced media independent interface (RMII) is the same as the specification of the media independent interface (MII), and these specifications are essentially according to IEEE 802.3 and IEEE 802.3u.

Comparing the reduced media independent interface (RMII) with the media independent interface according to the prior art, the most important improvement is that chip pin count is reduced. In the manufacture of chips and in packaging techniques, ping count influences cost. The greater the number of pins is, the higher the cost is. This means that the reduced media independent interface provides a good choice of interface count with the IEEE 802.3u specification. Please refer to FIG. 1. FIG. 1 is a schematic diagram of the reduced media independent interface (RMII). From the above, the reduced media independent interface (RMII) 10 is used for connecting a medium access control circuit (MAC circuit) 12 and a physical circuit 14 (PHY circuit). The reduced media independent interface can be separated into two parts by the transmission direction of signals and data: a transmitter 16 and a receiver 18. In the transmitter 16 the transmission direction of signals is from the medium access control circuit (MAC circuit) 12 to the physical circuit 14. In the receiver 18, the transmission direction of signals and data is from the physical circuit 18 to the medium access control circuit (MAC circuit) 12. The reduced media independent interface can be separated into a plurality of specialized interfaces. The interfaces in the transmitter 16 include a transmission data interface (TXD) and a transmission-enabling interface (TX_EN). The transmission data interface is used for transmitting data from the medium access control circuit (MAC circuit) 12 to the physical circuit (PHY circuit). In general, there are two transmission speeds: 10 Mb/s and 100 Nb/s. When the transmission-enabling interface (TX_EN) outputs a high voltage in an assert mode, the physical circuit 14 receives the data transmitted from the medium access control circuit (MAC circuit) 12 through the transmission data interface. In other words, when the transmission-enabling interface (TX_EN) is not in assert mode (ex: the transmission-enabling interface outputs a predetermined low-voltage signal), the physical circuit does not receive data from the medium access control circuit (MAC circuit) 12.

Please refer to FIG. 1. The receiver 18 of the reduced media independent interface (RMII) 10 includes a reference clock interface (REF_CLK), a receiving-enabling interface, an error-detecting interface (RX_ER) and a data receiving interface (RXD). The reference clock interface is used for providing a reference clock to the specialized interfaces of the reduced media independent interface 10 (RMII) that include the transmission data interface (TXD), the transmission-enabling interface (TX_EN), the receiving-enabling interface (CRS_DV), the error-detecting interface (RX_ER), and the data receiving interface (RXD). The reference clock is generated by the MAC circuit 12 or by an external source. Therefore, the detail interfaces of the reduced media independent interface 10 (RMII) operate synchronously according to the reference clock. Please refer to the FIG. 2. FIG. 2 is a time sequence diagram relating to the plurality of interfaces of the receiver 18 in the reduced media independent interface 10 (RMII). The data receiving interface (RXD) is used for transmitting data from the physical circuit 14 (PHY circuit) to the medium access control circuit (MAC circuit) 12. When the reduced media independent interface 10 (RMII) is in an idle mode (the receiving-enabling interface is at a predetermined low voltage), the medium access control circuit (MAC circuit) 12 rejects data from the physical circuit (PHY circuit) 14 through the data receiving interface. When the receiver 18 operates, the physical circuit (PHY circuit) 14 does not detect an invalid code or other error information and the physical circuit 14 (PHY circuit) does not detect data to be transmitted, the reduced media independent interface 10 (RMII) is not in the idle mode, the receiving-enabling interface is set to a predetermined high voltage, the error-detecting interface (RX_ER) is at a low voltage, the reduced media independent interface 10 (RMII) is in a transmission-enabling mode, and the medium access control circuit (MAC circuit) 12 receives data from the physical circuit 14 through the data receiving interface (RXD). When the physical circuit (PHY circuit) detects the invalid code or other error information, the error-detecting interface is in a predetermined high voltage and the medium access control circuit (MAC circuit) 12 detects data from the physical circuit 14 (PHY circuit) as invalid data. At this moment, the reduced media independent interface is in an error-detection mode, and the medium access control circuit (MAC circuit) 12 rejects data from the data receiving interface 14. So, the error-detecting interface (RX_ER) can improve the rate of transmission of correct data in the reduced media independent interface 10 (RMII).

However, in the requirement for reducing spin count and in consideration of conforming the specification of the reduced media independent interface 10 (RMII), when the prior art reduced media independent interface is designed adaptively, it is better to further reduce the pin count of the reduced media independent interface lower the cost of the related products.

SUMMARY OF INVENTION

It is therefore a primary objective of the claimed invention to provide an integrated reduced independent interface.

According to the claimed invention an integrated reduced media independent interface (Integrated RMII) for interconnecting a medium access control circuit (MAC circuit) and a physical circuit (PHY Circuit) includes a transmission data interface (TXD) for transmitting data from a media control circuit to the physical circuit (PHY circuit), a transmission-enabling interface (TX_EN) for controlling the transmission data interface (TXD), a reference clock (REF_CLK) interface for providing a reference clock to the integrated reduced media independent interface (Integrated RMII), a receiving-enabling interface (CRS_DV) for detecting a low-voltage indicating an error-detection mode and an idle mode, and a high voltage indicating a transmission-enabling mode and a data receiving interface (RXD) for transmitting the data from the physical circuit (PHY circuit) to the medium access control circuit (MAC circuit). Certainly, the integrated RMII could further comprise some parts being nothing about the transmition of the data. However, the parts are independent on the character(s) of the invention, and would not be discussed in the specification.

According to the claimed invention a method for transmitting data with an integrated reduced media independent interface (Integrated RMII) comprises the following steps: using the physical circuit (PHY circuit) to provide a low voltage to the receiving-enabling interface in a error-detection mode or an idle mode; using the physical circuit (PHY circuit) to provide a high voltage to the receiving-enabling interface in a transmission-enabling mode; using the medium access control circuit (MAC circuit) to receive the data transmitted from the physical circuit (PHY circuit) via the data receiving interface when the receiving-enabling interface outputs a high voltage; using the medium access control circuit (MAC circuit) to reject the data transmitted from the physical circuit (PHY circuit) via the data receiving interface when the receiving-enabling interface outputs a low voltage.

Significantly, to compare with the prior art, the invention integrates the error-detecting interface into the receiving-enabling interface so that the two functions of two conventional interface is performed by the presented integrated RMII interface. Therefore, the number of pins is reduced and then both the required material and the fabrication cost are reduced, but the functions of the presented integrated RMII interface are not degraded.

DETAILED DESCRIPTION

Figure 3:
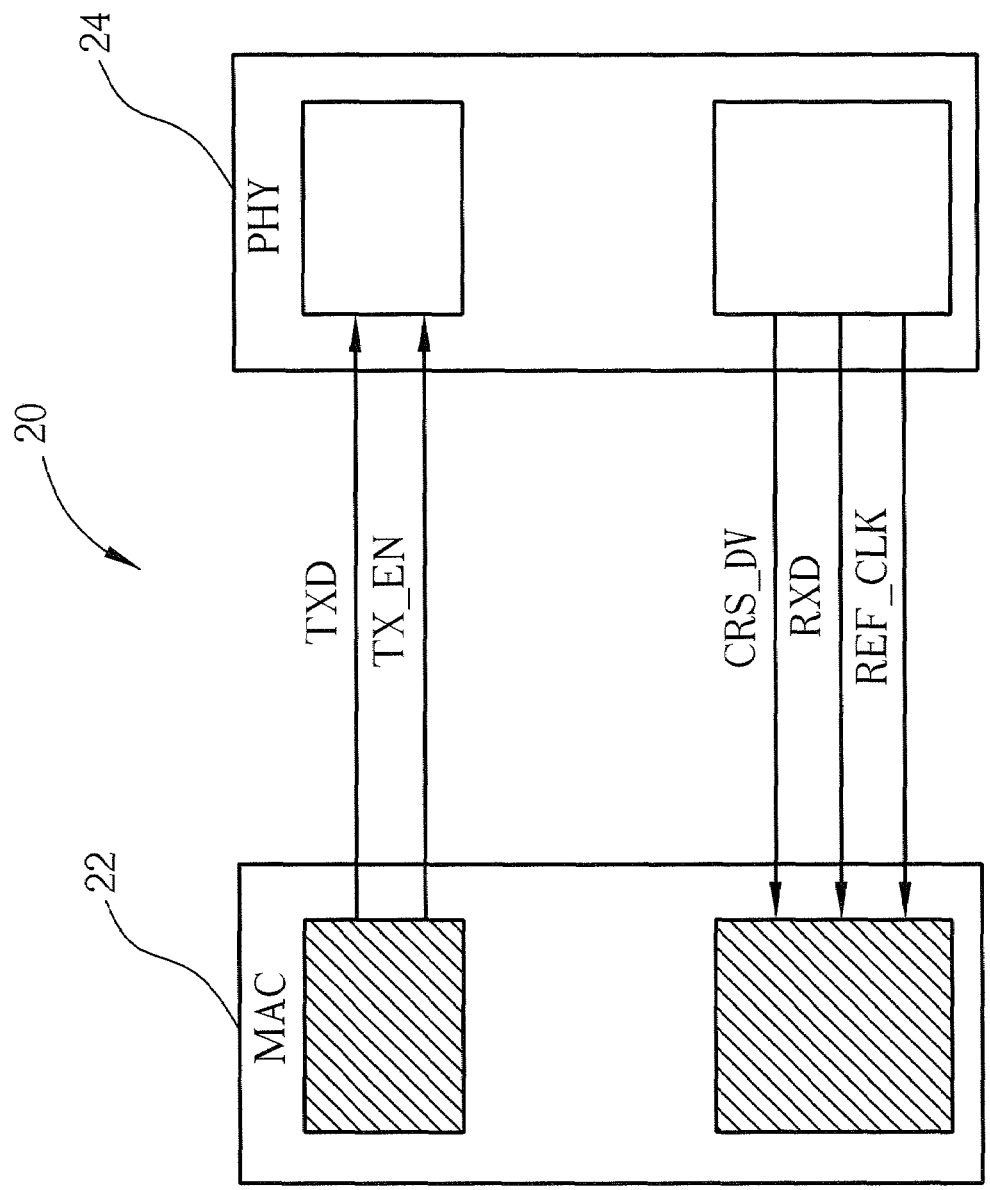
FIG. 3 is a schematic diagram of the integrated reduced media independent interface (RMII) according to the present invention.

The technical features of the invention are essentially based on the specification of reduced media independent interface according to IEEE 802.3 and 802.3u. The error-detecting interface, especially the function(s) of the error-detecting interface, is combined in the receiving-enabling interface in the invention without the external error-detecting interface (RX_ER). Please refer to FIG. 3. FIG. 3 is a schematic diagram of the integrated reduced media independent interface (RMII). Compared to the prior art, the integrated reduce media independent interface 20 is also used for connecting a medium access control circuit (MAC circuit) and a physical circuit 24 (PHY circuit). However, the integrated reduced media independent interface 20 without the external error-detecting interface (RX_ER) comprises a transmission data interface (TXD) for transmitting data from the medium access control circuit (MAC circuit) 22 to the physical circuit 24 (PHY circuit), a transmission-enabling interface (TX_EN) for controlling the transmission data interface (TXD), a reference clock interface for providing a reference clock, a receiving-enabling interface (CRS_DV) and a data receiving interface (RXD) for transmitting data from the physical circuit 24 (PHY circuit) to the MAC circuit 22. The reference clock is generated by a medium access control circuit (MAC circuit) 22 or an external source. The transmission interface (TXD), the transmission-enabling interface (TX_EN), the receiving-enabling interface (CRS_DV) and the data receiving interface (RXD) operate synchronously according to the reference clock.

Figure 1:
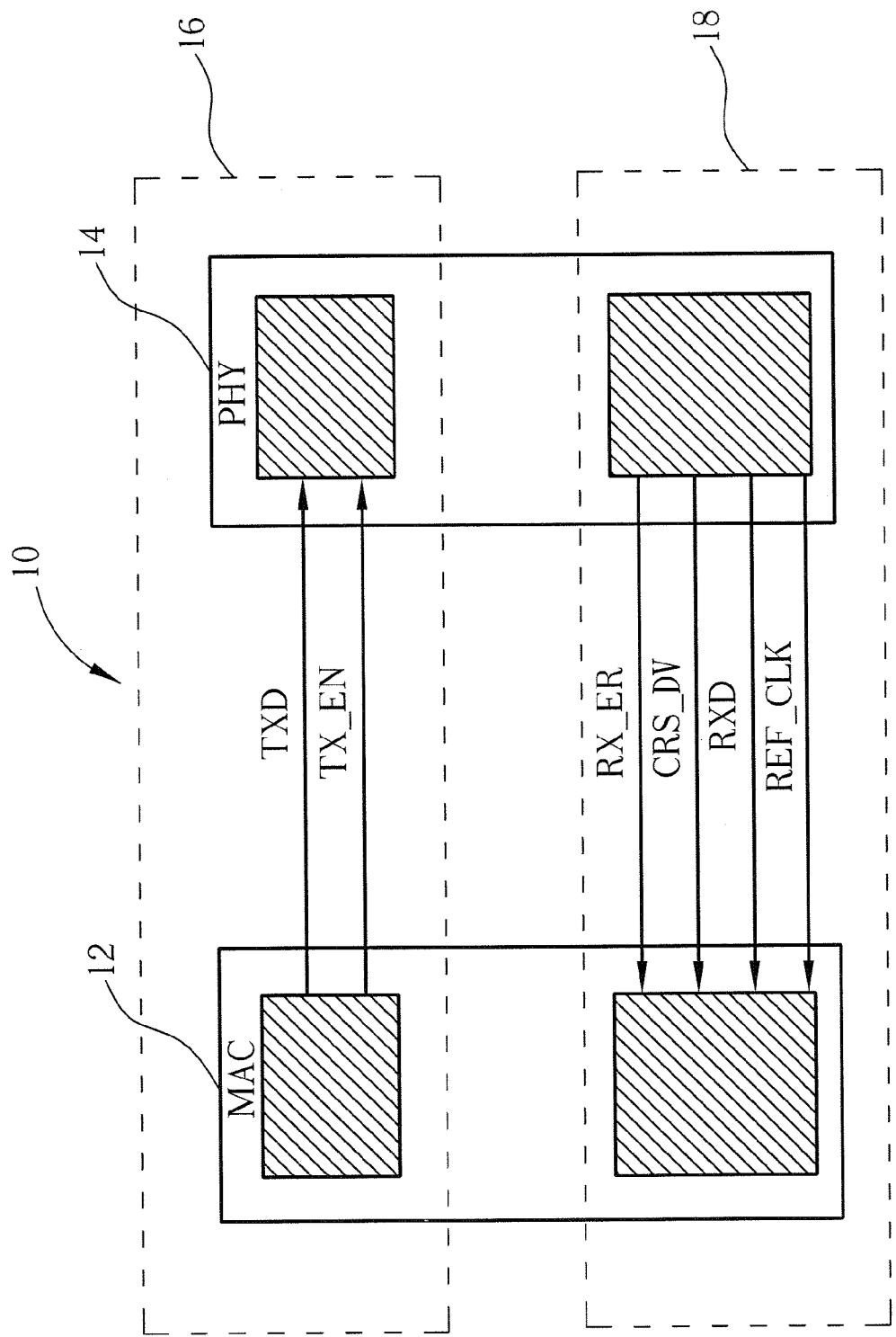
FIG. 1 is a schematic diagram of the reduced media independent interface (RMII) according to the prior art.
Figure 4:
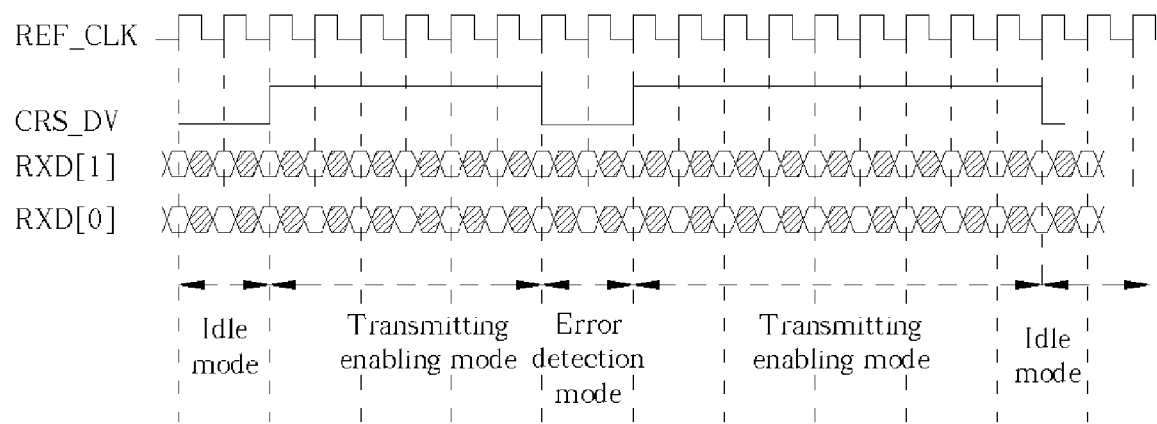
FIG. 4 is a time sequence diagram of operation of a plurality of interfaces in the integrated reduced media independent interface (RMII) of FIG. 3.

Please refer to FIG. 4. FIG. 4 is a time sequence diagram of operation of a plurality of interfaces in the integrated reduced media independent interface (RMII) 20 of FIG. 3. In the embodiment, the data receiving interface (RXD) is a binary transmission cable separated into two lines RXD[0] and RXD[1]. The data receiving interface RXD (RXD[0], RXD[1]) could transmits a binary data from the physical circuit 24 (PHY circuit) to the medium access control circuit (MAC circuit) 22 in a clock period of the reference clock. When the receiving-enabling interface is in the idle mode (the receiving-enabling interface is at a predetermined low voltage), the medium access control circuit (MAC circuit) 22 does not receive data transmitted from the physical circuit (PHY circuit) 24 through the data receiving interface (RXD). When the physical circuit (PHY circuit) 24 does not detect any invalid code or other error information and the physical circuit (PHY circuit) 24 detects data to be transmitted, the integrated reduced independent interface 20 is not in the idle mode. When the receiving-enabling interface is at a predetermined high voltage, the integrated reduced independent interface 20 is in a transmission-enabling mode. The medium access control circuit (MAC circuit) 22 receives data from the physical circuit (PHY circuit) 24 through the data receiving interface (RXD). When the physical circuit (PHY circuit) 24 detects the invalid code or other error information, the receiving-enabling interface (CRS_DV) is used for detecting the error as the structure of the integrated reduce media independent interface 20 is without the error-detecting interface. The receiving-enabling interface (CRS_DV) is set to a predetermined low voltage, and the MAC circuit 22 detects data transmitted from the data receiving interface (RXD) as invalid data and does not receive this data. At this moment, the integrated reduced media independent interface 20 is in an error-detection mode. In addition, the data receiving interface replaces the error-detecting interface of FIG. 1.

Figure 2:
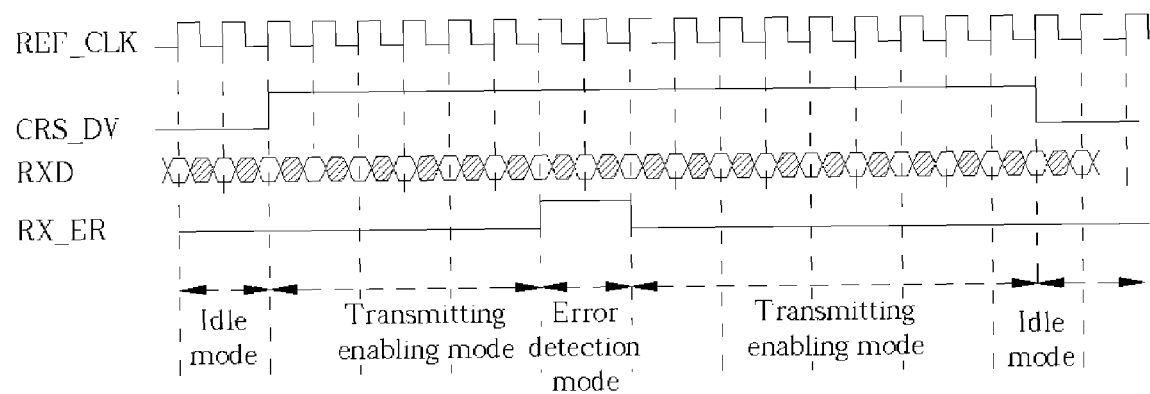
FIG. 2 is a time sequence diagram of operation of a plurality of interfaces in the reduced media independent interface (RMII) of FIG. 1.

Comparing FIG. 2 with the time sequence diagram in FIG. 4, the features of the invention are illustrated. In FIG. 2, the error-detecting interface (RX_ER) achieves the related function by raising the voltage in the error-detection mode. At the same time sample point, as shown in FIG. 4 the receiving-enabling interface (CRS_DV) lowers the voltage to achieve the related function in the integrated reduced media independent interface 20 of the invention to make the medium access control circuit (MAC circuit) 22 detect the transmitted data as invalid data and not receive such data.

In conclusion, under the controlling of the physical circuit 24 (PHY circuit) of FIG. 3, the error-detecting interface (RX_ER) is combined into the receiving-enabling interface (CRS_DV) and the receiving-enabling interface (CRS_DV) is at a low voltage in the error-detection mode (when the physical circuit (PHY circuit) detects an invalid code or other error information), and in an original idle mode (during system reset, when there is no transmission data, or when the physical circuit 24 (or the medium access control circuit (MAC circuit) 22 is not operating.). The receiving-enabling interface (CRS_DV) is at a high voltage in a transmission-enabling mode (when the physical circuit 24 does not detect an invalid code or other error information and detects that data is to be transmitted). This is because the data receiving interface (RXD) outputing a high voltage is specified in the specification of the reduced media independent interface (RMII) according to IEEE 802.3 and IEEE 802.3u. The medium access control circuit (MAC circuit) 22 receives data from the physical circuit 24 (PHY circuit) through the data receiving interface (RXD). When the receiving-enabling interface (CRS_DV) outputs a low voltage, the medium access control circuit (MAC circuit) 22 rejects data from the physical circuit 24 (PHY circuit) through the data receiving interface (RXD). Thus, it is not necessary to use the increases of the voltage in the error-detecting interface to alert the system. In the invention, a voltage drop in the receiving-enabling interface is used to achieve the goal of alerting to and rejecting receiving data. In this way, compared to the prior art, the pin count of the reduced media independent interface 24 (RMII) of FIG. 3 according to the invention is reduced to less than the pin count of the reduced media independent interface 10 (RMII) of FIG. 1. In addition, the Ethernet system resources of the integrated reduced media independent interface 20 according to the invention can be simplified.

Those skilled in the art will readily observe that numerous modifications and alterations of the device may be made while retaining the teachings of the invention. Accordingly, the above disclosure should be constructed as limited only by the metes and bounds of the appended claims.

The invention claimed is:

1. An integrated reduced media independent interface (Integrated RMII) for interconnecting a medium access control circuit (MAC Circuit) and a physical circuit (PHY Circuit), the integrated reduced media independent interface (Integrated RMII) comprising:
    a transmission data interface (TXD) for transmitting data from the medium access control circuit (MAC Circuit) to the physical circuit (PHY circuit);
    a transmission-enabling interface (TX_EN) for controlling the transmission data interface (TXD);
    a reference clock (REF_CLK) interface for providing a reference clock to the integrated reduced media independent interface (Integrated RMII);
    a receiving-enabling interface (CRS_DV) for detecting a low-voltage indicating an error-detection mode and an idle mode, and a high voltage indicating a transmission-enabling mode; and
    a data receiving interface (RXD) for transmitting the data from the physical circuit (PHY circuit) to the medium access control circuit (MAC circuit), wherein the medium access control circuit (MAC circuit) receives the data transmitted from the data receiving interface (RXD) when the receiving-enabling interface (CRS_DV) detects a high voltage and rejects the data transmitted from the data receiving interface (RXD) when the receiving-enabling interface (CRS_DV) detects a low voltage.

2. The integrated media independent interface of claim 1, wherein the integrated reduced media independent interface is in the error-detection mode when the physical circuit (PHY circuit) detects an invalid code or other error information.

3. The integrated media independent interface of claim 1, wherein the integrated reduced media independent interface is in the transmission-enabling mode when the physical circuit (PHY circuit) does not detect an invalid code or other error information and the physical circuit (PHY circuit) detects any data to be transmitted.

4. The integrated media independent interface of claim 1, wherein the data receiving interface operates synchronously with the reference clock when the receiving-enabling interface detects the high voltage.

5. The integrated media independent interface of claim 1, wherein the data receiving interface transmits a binary digital data from the physical circuit to the medium access control circuit (MAC circuit) during a clock period of the reference clock when the receiving interface detects a high voltage.

6. The integrated media independent interface of claim 1, wherein the reference clock is generated by the medium access control circuit (MAC circuit) or an external source.

7. The integrated media independent interface of claim 6, wherein the transmission data interface, the transmission-enabling interface and the data receiving interface operate synchronously with the reference clock.

8. The integrated media independent interface of claim 1 being implemented in an Ethernet.

9. The integrated media independent interface of the claim 1 being conforming to the specification of a reduced media independent interface (RMII) according to IEEE 802.3 and IEEE 802.3u.

10. A method for transmitting data with an integrated reduced media independent interface (Integrated RMII), wherein the integrated reduced media independent interface (Integrated RMII) interconnects a medium access control circuit (MAC Circuit) and a physical circuit (PHY Circuit) and the integrated reduced media independent interface (Integrated RMII) transmits data from the physical circuit (PHY circuit) to the medium access control circuit (MAC circuit) with a receiving-enabling interface (CRS_DV) and a data receiving interface, the method comprising:
    providing a low voltage to the receiving-enabling interface in an error-detection mode or an idle mode by using the physical circuit (PHY circuit);
    providing a high voltage to the receiving-enabling interface in a transmission-enabling mode by using the physical circuit (PHY circuit);
    receiving the data transmitted from the physical circuit (PHY circuit) via the data receiving interface when the receiving-enabling interface detects a high voltage by using the medium access control circuit (MAC circuit); and
    rejecting the data transmitted from the physical circuit (PHY circuit) via the data receiving interface when the receiving-enabling interface detects a low voltage by using the medium access control circuit (MAC circuit).

11. The method of claim 10, wherein the integrated reduced media interface is in the error-detection mode when the physical circuit (PHY circuit) detects an invalid code or other error information.

12. The method of clam 11, wherein the integrated reduced independent interface is in the transmission-enabling mode when the physical circuit (PHY circuit) does not detect the invalid code or the error information and the physical circuit (PHY circuit) detects data to be transmitted.

13. The method of claim 10, wherein the integrated reduced media independent interface further comprises a reference clock (REF_CLK) interface, the method further comprising:
    generating a reference clock and transmit the reference clock to the reference clock interface.

14. The method of claim 13, the reference clock is produced by referring to at least one of the following: the medium access control circuit (MAC circuit) and an external source.

15. The method of claim 13, wherein the data receiving interface transmits at least a binary digital data from the physical circuit (PHY circuit) to the medium access control circuit (MAC circuit) during a clock period when the receiving-enabling interface detects a high voltage.

16. The method of claim 15, wherein the receiving-enabling interface and the data receiving interface operate synchronously with the reference clock.

17. The method of claim 10, wherein the integrated reduced media independent interface is implemented in an Ethernet.

18. The method of claim 10, wherein the integrated media independent interface conforms to the specification of a reduced media independent interface (RMII) according to IEEE 802.3 and IEEE 802.3u.

* * * * *